United States Patent
Cahan et al.

(10) Patent No.: US 11,002,614 B2
(45) Date of Patent: May 11, 2021

(54) LOW COST CONTAINER CONDITION MONITOR

(71) Applicant: International Business Machines Corporation, Armonk, NY (US)

(72) Inventors: Amos Cahan, Dobbs Ferry, NY (US); Guy M. Cohen, Ossining, NY (US); Lior Horesh, North Salem, NY (US); Raya Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/557,158

(22) Filed: Aug. 30, 2019

(65) Prior Publication Data
US 2019/0383671 A1  Dec. 19, 2019

Related U.S. Application Data

(62) Division of application No. 15/272,146, filed on Sep. 21, 2016, now Pat. No. 10,436,651.

(51) Int. Cl.
*G01K 11/06* (2006.01)
*G01K 7/24* (2006.01)
*G01K 11/12* (2021.01)

(52) U.S. Cl.
CPC ............ *G01K 11/06* (2013.01); *G01K 7/24* (2013.01); *G01K 11/12* (2013.01);
(Continued)

(58) Field of Classification Search
CPC .......... G01K 11/06; G01K 7/24; G01K 11/12; G01K 2207/04; G01K 2207/08; G01K 2207/00; G01K 2207/02
See application file for complete search history.

(56) References Cited

U.S. PATENT DOCUMENTS 4,278,970 A * 7/1981 Streczyn .............. A61B 5/01
337/298
8,114,686 B2  2/2012 Habib et al.
(Continued)

FOREIGN PATENT DOCUMENTS

| CN | 203758640 U | 8/2014 |
|----|-------------|--------|
| EP | 989391 A2 | 3/2000 |
| JP | S58162824 A | 9/1983 |

OTHER PUBLICATIONS

Morales-Sanchez et al., "Crystallization of SbTe Phase Change Optical Films," 4th International Conference on Electrical and Electronics Engineering 2007, pp. 330-332 (Sep. 2007).
(Continued)

*Primary Examiner* — Daniel S Larkin
*Assistant Examiner* — Anthony W Megna Fuentes
(74) *Attorney, Agent, or Firm* — Anthony Curro; Michael J. Chang, LLC

(57) ABSTRACT

Low-cost techniques for sensing ambient temperatures in a container or package using phase change materials are provided. In one aspect, a temperature sensor is provided. The temperature sensor includes: at least one phase change material configured to transition from an amorphous state to a crystalline state upon exposure to temperatures above a predetermined threshold temperature for a given duration. A method of monitoring temperature exposure of a consumer good using the temperature sensor is also provided.

15 Claims, 4 Drawing Sheets

(52) U.S. Cl.
CPC ..... *G01K 2207/00* (2013.01); *G01K 2207/02* (2013.01); *G01K 2207/04* (2013.01); *G01K 2207/08* (2013.01)

(56) References Cited

U.S. PATENT DOCUMENTS

| | | |
|---|---|---|
| 8,556,501 B2 | 10/2013 | Topham et al. |
| 2007/0109121 A1* | 5/2007 | Cohen .............. G06K 19/07767 340/539.26 |
| 2011/0022532 A1 | 1/2011 | Kriss |
| 2013/0068155 A1 | 3/2013 | Patel |
| 2013/0278226 A1 | 10/2013 | Cong et al. |
| 2013/0308378 A1* | 11/2013 | Manaka ................. G01K 11/06 365/163 |
| 2013/0322488 A1 | 12/2013 | Yazami et al. |
| 2015/0362376 A1 | 12/2015 | Jedema et al. |

OTHER PUBLICATIONS

English translation of EP989391A2 by Rothmund, et al., Mar. 29, 2000 (8 pages).
English Abstract of JPS58162824A by Yamagishi Katsuaki, et al., Sep. 27, 1983 (2 pages).
English translation of CN203758640U by Li Wanru, et al., Aug. 6, 2014 (3 pages).
List of IBM Patents or Applications Treated as Related (2 pages).

\* cited by examiner

LOW COST CONTAINER CONDITION MONITOR

CROSS-REFERENCE TO RELATED APPLICATION(S)

This application is a divisional of U.S. application Ser. No. 15/272,146 filed on Sep. 21, 2016, now U.S. Pat. No. 10,436,651, the disclosure of which is incorporated by reference herein.

FIELD OF THE INVENTION

The present invention relates to monitoring conditions in a container, and more particularly, to low-cost techniques for sensing ambient temperatures in a container or package using phase change materials (PCMs).

BACKGROUND OF THE INVENTION

In most cases, temperature is the most important parameter to monitor when handling packed medicine, chemicals, and even food. The rate of many chemical reactions is typically exponential with temperature change (see Arrhenius equation). Thus the shelf life of a packaged good and the efficacy of the content can substantially change due to an exposure to high temperatures. In some cases, such as with packaged medicine, the exposure to high temperatures can render a drug ineffective, which can lead to dangerous situations.

It is therefore important to monitor and record the package temperature history and, at a minimum, be able to tell if a packaged good was exposed to a temperature that exceeds the maximum allowed temperature. While a variety of different techniques exist that could be used for monitoring packaging temperatures over time, the cost of the associated devices is typically too high as compared to the cost of the packaged goods to justify embedding such a device in each package. Accordingly, there is a need for a monitoring device with a cost so low that it does not substantially change the overall price of the packaged goods.

Another issue is that most monitoring devices require a power supply to maintain their operation. While the inclusion of a battery is possible, it raises the package cost, it limits the monitoring period to that of the battery life, and in very cold environments, where packages are sometimes stored, battery operation is limited. These issues make it more desirable to have a monitoring device that is passive, and does not require a power source for operation.

Thus, there is a need for a simple, low cost passive device to monitor materials in containers to assure that their content is safe and worthy of using.

SUMMARY OF THE INVENTION

The present invention provides low-cost techniques for sensing ambient temperatures in a container or package using phase change materials. In one aspect of the invention, a temperature sensor is provided. The temperature sensor includes: at least one phase change material configured to transition from an amorphous state to a crystalline state upon exposure to temperatures above a predetermined threshold temperature for a given duration. By way of example only, the temperature sensor can include multiple phase change materials, each having a different predetermined threshold temperature. Further, the at least one phase change material can be configured to change reflectivity upon exposure to temperatures above the predetermined threshold temperature.

In another aspect of the invention, a method of monitoring temperature exposure of a consumer good is provided. The method includes: placing a temperature sensor on or near the consumer good, wherein the temperature sensor includes at least one phase change material configured to transition from an amorphous state to a crystalline state upon exposure to temperatures above a predetermined threshold temperature for a given duration; and reading the sensor to determine a state of the at least one phase change material. For instance, the at least one phase change material can be patterned into a message that is only visible to a user when the at least one phase change material is in a crystalline state, and the temperature sensor is read optically. Alternatively, the temperature sensor can include a radio-frequency identification (RFID) circuit in which the at least one phase change material is present as a resistor, and the temperature sensor is read electrically based on output from the RFID circuit.

A more complete understanding of the present invention, as well as further features and advantages of the present invention, will be obtained by reference to the following detailed description and drawings.

DETAILED DESCRIPTION OF PREFERRED EMBODIMENTS

Figure 1:
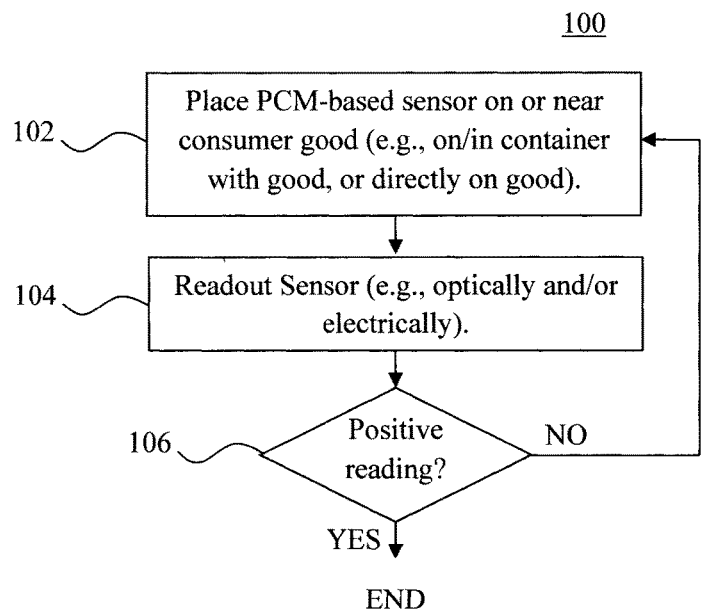
FIG. 1 is a diagram illustrating an exemplary methodology for monitoring exposure of a consumer good to high temperature conditions using the present phase change material (PCM)-based temperature sensors according to an embodiment of the present invention.

Provided herein are low-cost techniques for sensing ambient temperatures in a container or package. The present sensors employ a class of materials known as phase change materials (or PCMs) to sense the ambient temperature in a package. Advantageously, the sensor is passive and the recording of the temperature is accomplished by a change in the phase of the PCM. The phase of the PCM is read optically by observing a change in reflectivity and/or it can be read electrically by powering a simple radio-frequency identification (RFID)-type of circuit electrically connected to the PCM sensing element.

The present techniques leverage the notion that the optical properties and/or electric resistance of PCMs can be changed when the PCM is exposed to a certain range of temperatures over a certain range of time. The use of such materials enables battery-less monitoring at a very low cost.

PCMs typically have two phases. In a first phase (an amorphous phase) the material has high resistivity (as compared to the crystalline phase—see below). When the material is heated up above some threshold temperature (which varies depending on the particular PCM being employed), the material transitions into a second phase (a crystalline phase). The crystalline phase is characterized by a lower resistance (i.e., as compared to the amorphous phase). Cooling down the material does not revert the phase. Thus, PCMs are well suited to document temperature excursions above their respective transition thresholds.

PCMs are available at a large range of threshold temperatures for their phase transition. Thus, a vast selection of candidate PCMs are available to pick from for a particular application(s) and a given temperature threshold(s). By incorporating the PCM in a sensor that is embedded in the package, it is easy to tell if the package temperature has at some point exceeded a given transition threshold of the select PCM. Furthermore, embodiments are anticipated herein where multiple PCMs with different transition thresholds are employed in the same package. By embedding PCM materials with different threshold temperatures the sensor can report a range of temperatures that the package has been exposed to (e.g., by indicating what range of transition threshold temperatures has been exceeded).

To use a simple example to illustrate this concept, say the sensor embedded in the package contains PCMs A, B, C, and D, which have transition temperatures $T_A$, $T_B$, $T_C$, and $T_D$, respectively, wherein $T_A < T_B < T_C < T_D$. If upon reading the sensor it is found that the PCMs A and B are in the crystalline phase, and C and D are in the amorphous phase, then it may be deduced that the package has seen temperatures exceeding $T_A$ and $T_B$, but perhaps not as high as $T_C$ or $T_D$. However, if only one PCM A was used in the sensor, and it is crystalline, then at most one would know that the package temperature has exceeded $T_A$, but not by how much.

PCMs can differ not only in the threshold temperature in which phase change occurs, but also in the speed at which such changes occur. Thus, advantageously, the PCM material(s) used in the present sensor can be selected such that phase change occurs only after the container or package has been exposed to a certain temperature for a minimal duration (which can be predetermined based on the phase change properties of the PCM(s) selected for the sensor). Being able to set a duration boundary on temperature excursions might be useful, for example, when monitoring containers of food. Bacteria proliferate when environmental conditions are suitable, such as an ambient temperature above a certain threshold. Bacterial proliferation can reduce the shelf life of products and pose hazards to consumers. However, proliferation of microorganisms may not occur if the temperature threshold is crossed only briefly. Therefore, according to an exemplary embodiment, when monitoring the suitability of goods such as food, the PCM(s) is/are engineered to change to the crystalline phase only after a predetermined duration of high temperature exposure.

Further, the transition to a crystalline phase will complete only after a cumulative time exposure to the predetermined elevated temperature. It is notable that if multiple short exposures to elevated temperature occur, the PCM material integrates the exposures. As a result, N short exposures to high temperature of duration $t_{expo}$, would result in a similar change to the PCM as a single exposure of duration $N*t_{expo}$. Another way to look at this is say, for instance, that the PCM is exposed to momentary temperatures above the threshold (i.e., for a duration not long enough to transition the PCM to the crystalline phase). After the exposure, the PCM does not go back to its pre-exposure state. Instead, the next short exposure will put the PCM closer to a transition to the crystalline phase, and so on, until the transition occurs. As a result the PCM will provide a reliable indicator for food spoilage if the bacteria growth has short incubation time compared with the exposure time at elevated temperature.

Therefore, the parameters measureable via the present PCM-based sensor include, but are not limited to, temperature excursions over a predetermined temperature(s), a duration of the temperature excursions and/or an accumulation of short duration exposures. As provided above, these parameters can be measured based on the configuration of the PCM or, preferably, multiple PCMs, included in the sensor. For instance, as provided above, multiple PCMs can be used to establish a range of temperature variations.

FIG. 1 is a diagram illustrating an exemplary methodology 100 for monitoring exposure of a consumer good to high temperature conditions using the present PCM-based sensors. Accordingly, consumer goods most benefited by this process are those that are sensitive to high-temperatures (i.e., temperatures above a certain threshold temperature). Of course, the goods that fit into this category are vast. Therefore, as a representative group, some examples of temperature-sensitive consumer goods include, but are not limited to, foods, chemicals, medications, reagents, electronic hardware, clothing, art pieces, etc.

In step 102, the present PCM-based sensor is placed on or in close proximity to the consumer good. For instance, in one exemplary embodiment, the PCM-based sensor is placed in or on the same package or container as the consumer good. By way of example only, the packaging can include a box, a bag, a bottle, a flask, an ampule, a syringe, a test tube, a tray, a multi-well plate, etc. For instance, when the consumer good is a food item in a container, then the PCM-based sensor can be placed like a label on the outside of the container, or within the container.

Alternatively, according to another exemplary embodiment, the PCM-based sensor might be affixed directly to the consumer good. For example, when the consumer good is an article of clothing that would be damaged by high temperatures (such as during washing, ironing, etc.), then the PCM-based sensor can be fashioned as a label that is affixed directly to the clothing.

As provided above, the PCM-based sensor can include one, or preferably, multiple PCMs with different temperature transition thresholds. With multiple PCMs, a range of temperatures and/or duration or exposure can be detected. An example implementing multiple PCMs with different threshold temperatures was provided above. With regard to the duration of exposure, the same general principle applies. For instance, multiple PCMs can be employed that require different durations of exposure (above a threshold temperature) to transition from the amorphous to the crystalline phase. To use a simple example to illustrate this concept, say the sensor contains PCMs a, b, c, and d, which require different durations of high-temperature exposure (above the threshold temperature), i.e., duration a, duration b, duration c, and duration d, respectively, for transition, and wherein duration a<duration b<duration c<duration d. If upon reading the sensor it is found that the PCMs a and b are in the crystalline phase, and c and d remain in the amorphous phase, then it may be deduced that the good has seen high-temperatures for a duration exceeding duration a and duration b, but perhaps not as long as duration c or duration d.

In step 104, readout of the sensor is performed to determine the conditions to which the good has been subjected. As provided above, using the present PCM-based sensors, these conditions can include temperature and/or range of temperatures the good has been subjected to, and preferably the duration of the exposure (optionally also as a range).

Readout in step 104 can be performed at any stage of handling, such as during storage of the good (pre- or post-sale) by the manufacturer, during shipping and/or transport, post-purchase by the consumer, etc. Namely, due to the simple and convenient readout methods described herein, the state of the sensor can be easily ascertained by any party involved in handling of the good, without any specialized equipment. For instance, in one exemplary embodiment, an optical readout method is anticipated where the PCM-based sensor is incorporated into a label that changes visually (e.g., perceptive to someone simply looking at the label) if/when the PCM transition occurs. For instance, a user-friendly design is described below, where the PCM is configured as a message to the user that is set initially against a same color background, and thus not visible to the user. However, upon transition to the crystalline phase the reflective properties of the PCM change relative to the background, and the message becomes visible to the user. To use a simple example, the PCM message "NOT" can be placed before the phrase "SAFE TO CONSUME" on the label. However, when in the amorphous form the PCM message is set against the same color background, and thus not visible to the consumer. Thus all the consumer sees is the phrase "SAFE TO CONSUME." Upon transition (due to high-temperature exposure), the PCM visibly changes making it distinguishable from the background. In that case, the consumer now sees the message "NOT SAFE TO CONSUME." This exemplary embodiment is described in further detail below.

Another readout method anticipated herein (which optionally can be used in conjunction with the above-described optical readout) is an electrical readout method. As will be described in detail below, a simple passive RFID circuit which integrates the PCM material(s) as a resistor can be employed, which is readout using a simple comparator and/or frequency shifter circuit. Advantageously, use of RFID technology eliminates the need for battery or other sensor power source for readout. To obtain data from the RFID circuit, all that is needed is an RFID reader placed near the sensor. A standard RFID reader can be used for readout or, as described below, a properly equipped smart phone (e.g., a smart phone with near-field communication (NFC) capabilities) is also envisioned as a possible RFID reader. Advantageously, being able to interface with RFID technology via a smart phone further enables use of the present techniques in situations where consumers readily have smart phone technology at their disposal to extract data from the sensors, such as at home or at work, while shopping, etc.

In step 106, a determination is made as to whether the readout is positive—i.e., whether the sensor indicates high-temperature exposure. If the sensor reading (YES) is positive, meaning that the good has been exposed to high temperatures, then the process ends. The consumer or other handler of the good can then determine what to do with the exposed product, e.g., discard, return for a refund, exchange for new product, etc. On the other hand, if the sensor reading (NO) is negative, meaning that the good has not been exposed to high temperatures, then the process can be iterated at one or more later times to keep track of the conditions. For instance, a manufacturer might make periodic checks of their products, as might the shipper, retailer, and/or end-user consumer, etc. All of these parties are considered potential users of the present techniques.

As provided above, readout of the present PCM-based sensor can be performed electrically via a passive RFID circuit in which the PCM(s) is/are incorporated as a resistor. One example of such a circuit is a simple comparator circuit 200 as shown in FIG. 2.

Figure 2:
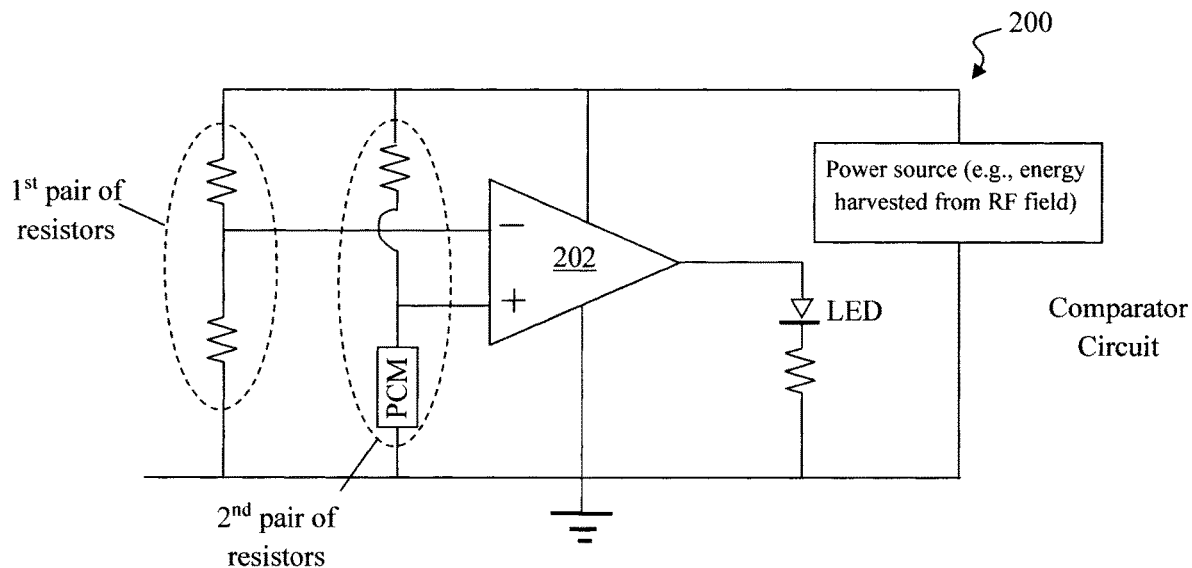
FIG. 2 is a comparator circuit used to detect if a package has (at one or more times) exceeded a maximum temperature according to an embodiment of the present invention.

As shown in FIG. 2, circuit 200 includes an operational amplifier 202 that compares the input from two pairs of 'resistors,' one pair includes two resistors and the other includes a resistor in series with the PCM(s) as the equivalent of a resistor. Namely, as described above, when in the amorphous form the PCM acts as a resistor. Thus, initially, the input to operational amplifier 202 is the same from both pairs of resistors.

However, when exposed to high-temperatures the PCM changes to its crystalline phase which has low resistivity. As a result of this exposure and phase change, the resistance across the $2^{nd}$ pair of resistors changes, and there is a voltage drop on the (+) and (−) inputs to the operational amplifier 202. As a result, the light emitting diode (LED) or other similar (visual) indicator which is connected to the output of the operational amplifier 202 will light up. Illumination of the LED indicator will occur when an RFID reader is near the sensor circuit. Specifically, according to an exemplary embodiment, the 'power source' in circuit 200 comes from the energy harvested from a radio frequency (RF) electromagnetic field emitted by an RFID reader. See below. The RFID reader might be a hand-held conventional RFID reader (which can be brought to the sensor) or a stationary unit (to which the container or package containing the sensor can be brought) or, as described in detail below, the RFID reader can be a smart phone thereby enabling consumers to leverage the technology generally at their disposal to read the sensor. Furthermore, even with smart phones that are not equipped with RFID capabilities, energy from RF electromagnetic field emitted by the device (e.g., WiFi and Bluetooth®) can be harvested to power the circuit.

As described above, the present sensor design can include multiple PCMs with different threshold temperatures, exposure duration thresholds, etc. To incorporate multiple PCMs into the comparator circuit design, one can simply duplicate the comparator circuit 200 with each version containing a different PCM. That way, during readout, one can read the results of the various PCMs based on which of the LEDs is lighted. The LEDs can be labeled, color-coded, or in another way distinguished as to which of the PCMs they are linked. See, for example, FIG. 2A.

Figure 2A:
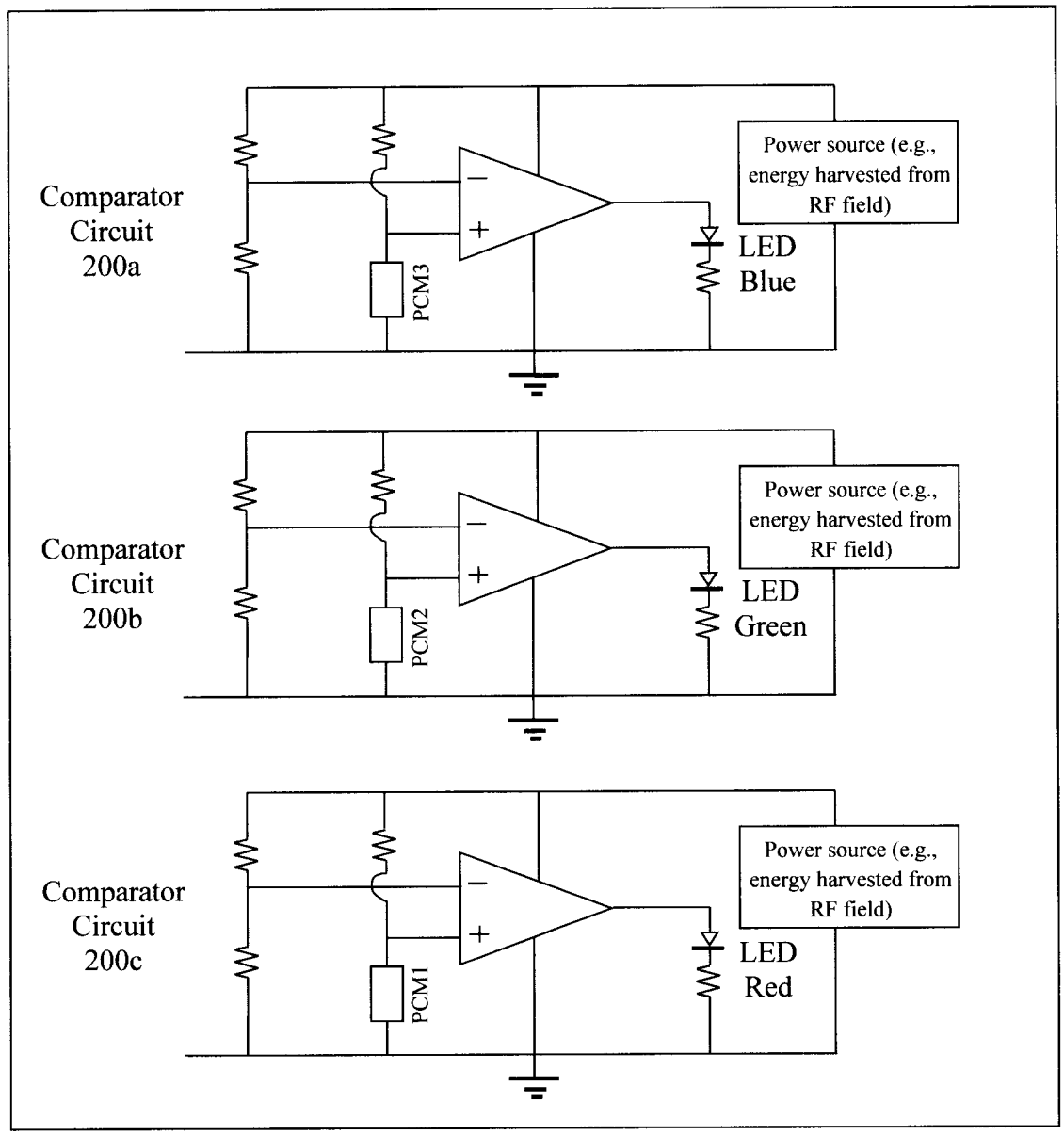
FIG. 2A is a variation of the comparator circuit having multiple PCMs according to an embodiment of the present invention.

In the example depicted in FIG. 2A, the comparator circuit 200 is replicated in triplicate (i.e., 200a, 200b, and 200c) with four different PCMs, i.e., PCM1, PCM2, and PCM3. The corresponding LEDs are color-coded as Red, Green, and Blue. Thus, if the transition temperatures of the PCMs ($T_{PCM}$) are $T_{PCM1} < T_{PCM2} < T_{PCM3}$, then during readout a Red and Green LED indicates that the good has been exposed to temperatures exceeding $T_{PCM1}$ and $T_{PCM2}$ but not as high as $T_{PCM3}$.

Figure 3:
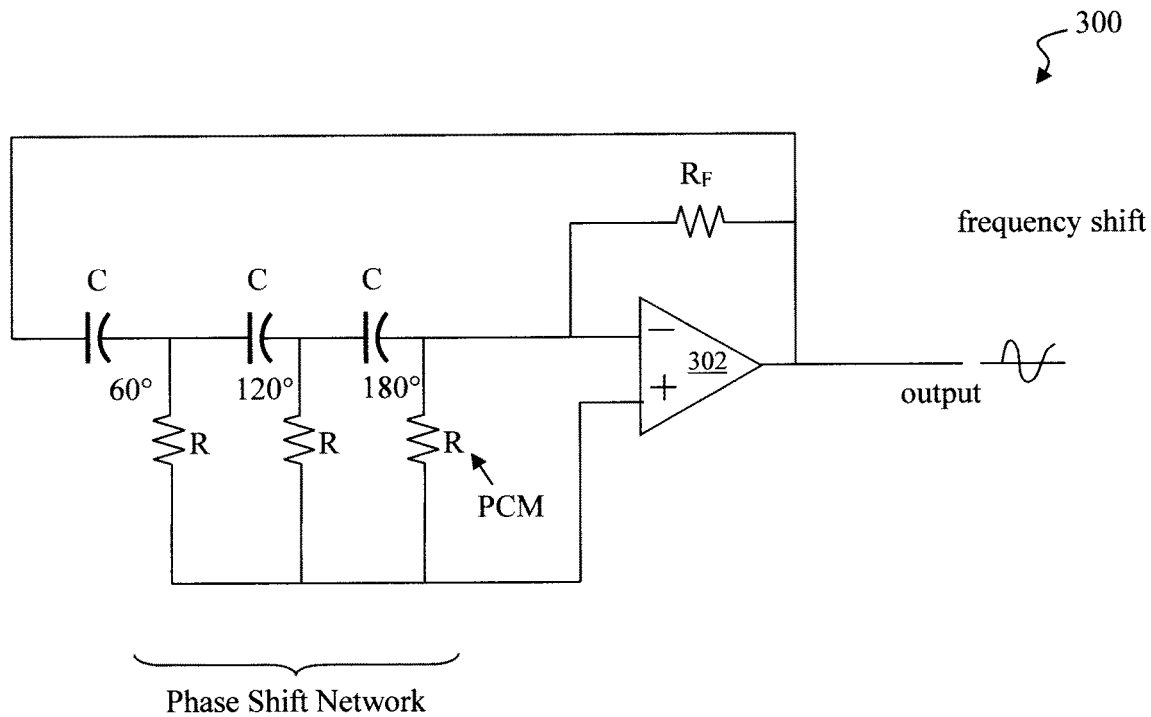
FIG. 3 is a frequency shifter circuit used to detect if a package has (at one or more times) exceeded a maximum temperature according to an embodiment of the present invention.

Another exemplary circuit that permits electrical readout of the present PCM sensor is a frequency shifter circuit 300 as shown in FIG. 3. In the same general manner as the comparator circuit 200, a PCM is the equivalent of a resistor in the frequency shifter circuit 300 and its transition from a high-resistivity amorphous state to low-resistivity crystalline state upon exposure to high temperatures affects the output (in this case the frequency of the output from the circuit. Specifically, as shown in FIG. 3, the PCM is included in a phase shift feedback loop of capacitors (C) and resistors (R) (having a phase shift of 60°, 120°, and 180°), wherein the oscillation frequency depends on the product of R*C. Thus, the state of the PCM (the equivalent of one of the resistors) shifts the frequency of the signal through, in this case, operational amplifier 302. The output of the sensor can be ascertained simply by reading the oscillation frequency of the circuit, which will shift based on the phases of the PCM output frequency. For instance, when an RFID reader is placed near the sensor (or vice versa), the returned RF signal is modulated by the output frequency from the circuit 300.

As with the layout provided in FIG. 2A, duplicates of the circuit 300 can be employed, each having a different PCM. In that manner, the present sensor design can include multiple PCMs with different threshold temperatures, exposure duration thresholds, etc.

Suitable PCMs include, but are not limited to, chalcogenide alloys. For instance, according to an exemplary embodiment, the PCM is an alloy containing the chalcogenide element tellurium (Te) in combination with other elements such as antimony (Sb) and/or germanium (Ge), forming alloys such as SbTe, GeTe, and GeSbTe. The properties of these PCM alloys can vary depending on their composition. For instance, taking an SbTe PCM as an example, the onset temperature for the phase change can be tuned by changing the Sb:Te ratio. See, for example, Morales-Sanchez et al., "Crystallization of SbTe Phase Change Optical Films," 4$^{th}$ International Conference on Electrical and Electronics Engineering, 2007 (September 2007) (hereinafter "Morales-Sanchez"), the contents of which are incorporated by reference as if fully set forth herein. For instance, as described in Morales-Sanchez, tuning the phase change to occur at a variety of different temperatures ranging from about 60° C. to about 100° C. can be achieved simply by increasing the Sb:Te ratio.

With regard to duration, for long durations the transition time can be tuned by the temperature margin between the storage temperature and the phase transition temperature. For short durations, the transition time can be controlled by controlling the mechanism that governs the crystallization (growth-dominated material versus nucleation-dominated material).

Another useful property that can be tuned based on the composition of the PCM is the reflectivity of the material. As highlighted above, the PCM material readout can also be done optically, and reflectivity can change how the PCM appears to the user. For instance, Morales-Sanchez describes the measured reflectivity of films of antimony telluride Sb(x)Te(1-x) as a function of the film temperature. The films observed in Morales-Sanchez included $Sb_{83}Te_{17}$, $Sb_{81}Te_{19}$, $Sb_{75}Te_{25}$, $Sb_{71}Te_{29}$, and $Sb_{67}Te_{33}$. In the amorphous phase, the measured reflectivity of all the films is low. Taking for example the $Sb_{83}Te_{17}$ film, as the film temperature reaches about 60° C. the measured reflectivity abruptly increases indicating that the phase changed to crystalline. It is notable that if the film is subsequently cooled to a temperature below 60° C. the phase will remain crystalline. As such the sensor will maintain the temperature history, and the event of exceeding a maximum allowed temperature will be stored in the film for later readout by optical or electrical means.

Reflectivity affects the color objects appear to a user. Thus, if reflectivity of the PCM changes above the threshold temperature, then the color of the PCM also changes. This notion can be leveraged for an optical readout scheme. In its simplest form, a label can be created from the PCM and, depending on the color of the label, the user knows whether high-temperature exposure has occurred indicating that the container content should not be used.

Figure 4:
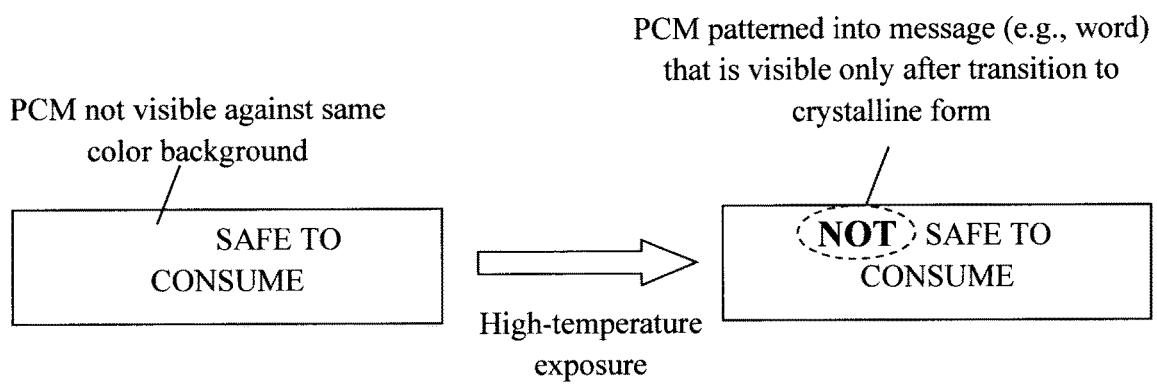
FIG. 4 is a diagram illustrating an exemplary optical readout scheme according to an embodiment of the present invention.

A preferred, user-friendly approach is also contemplated herein where the PCM is present in the shape of a message (e.g., letters or words) that conveys meaning to a user upon reading the message. For instance, the PCM can be patterned into the shape of the message (e.g., the PCM is patterned into various letters and/or words). Alternatively, a patterned mask can be placed over the PCM, where the mask is patterned with various letters and/or words, and where the PCM is visible through the patterned letters and/or words). As described above, the message can be set against a background color that is the same as the PCM message in the amorphous form. However, upon exposure to temperatures above the threshold, the reflectivity of the PCM message will change relative to the background. Thus, the PCM message will appear as a different color than the background, and thus will now be visible to the user who looks at the label. See, for example, FIG. 4. In the example depicted in FIG. 4, the label is preprinted with the message "SAFE TO CONSUME" and the PCM message is simply the word "NOT" set against a same color background when the PCM message is in the amorphous state. Thus, the user will only see the message "SAFE TO CONSUME." However, after high-temperature exposure and transition to the crystalline state, the PCM message "NOT" will become visible before the message "SAFE TO CONSUME." The user will then know that the container content should not be used. When a patterned mask is used over the (unpatterned) PCM, the mask preferably has the same color as the PCM in the amorphous form and the background. Thus, prior to exposure, the mask is indistinguishable from the PCM and the background. However, upon exposure, the reflectivity of the PCM will change relative to the mask and background thus making the PCM visible from behind the mask (through the message patterned in the mask).

As provided above, readout of the sensor can be performed optically (e.g., by simply viewing a PCM message set against a selective background, looking at an indicator LED, etc.) and/or electrically via an RFID reader that is brought near the sensor or vice versa. This RFID reader can be a conventional reader or, alternatively, a smart phone.

When readout is performed using a smart phone, the readout of the sensor is displayed on the smart phone screen. This is different than the other embodiments provided above where the readout was attached to the container or package such as the light of an LED goes on or is off, or the optical readout, such as the text "NOT" preceding the text "SAFE TO CONSUME," etc.

In this example, the energy for the operation of the circuit (see, for example, circuits 200 and 300—described above) that "reads" the PCM resistor is harvested from the radio frequency RF (electromagnetic field) emitted by the smart phone. For example, in one exemplary embodiment, that harvested RF energy is used to operate a comparator circuit (such as circuit 200—described above) that can light up a LED. However, rather than powering a LED, one can power a transmitter circuit that sends the "good/bad" information (which is based on the sensor being in one of two states "PCM resistor is crystalline/PCM resistor is amorphous") to a receiver in the smart phone. The receiver in the smart phone receives the information and, through an application, the phone would display, for example, "GOOD TO USE" or "NOT GOOD TO USE" depending on the received information.

Some smart phones come equipped with such hardware (receiver and transmitter) as they use NFC which is a specialized type of RFID. However, even if a given smart phone does not have full RFID capabilities it still can be used to provide RF energy to power up the sensor circuit.

As for the frequency shifter circuits (such as circuit 300—described above), the same principles apply. The frequency can be used to modulate an RF signal and the receiver on a smart phone can demodulate that frequency from the RF signal. This is just another way to transmit information such as in frequency modulation (FM) or amplitude modulation (AM).

Figure 5:
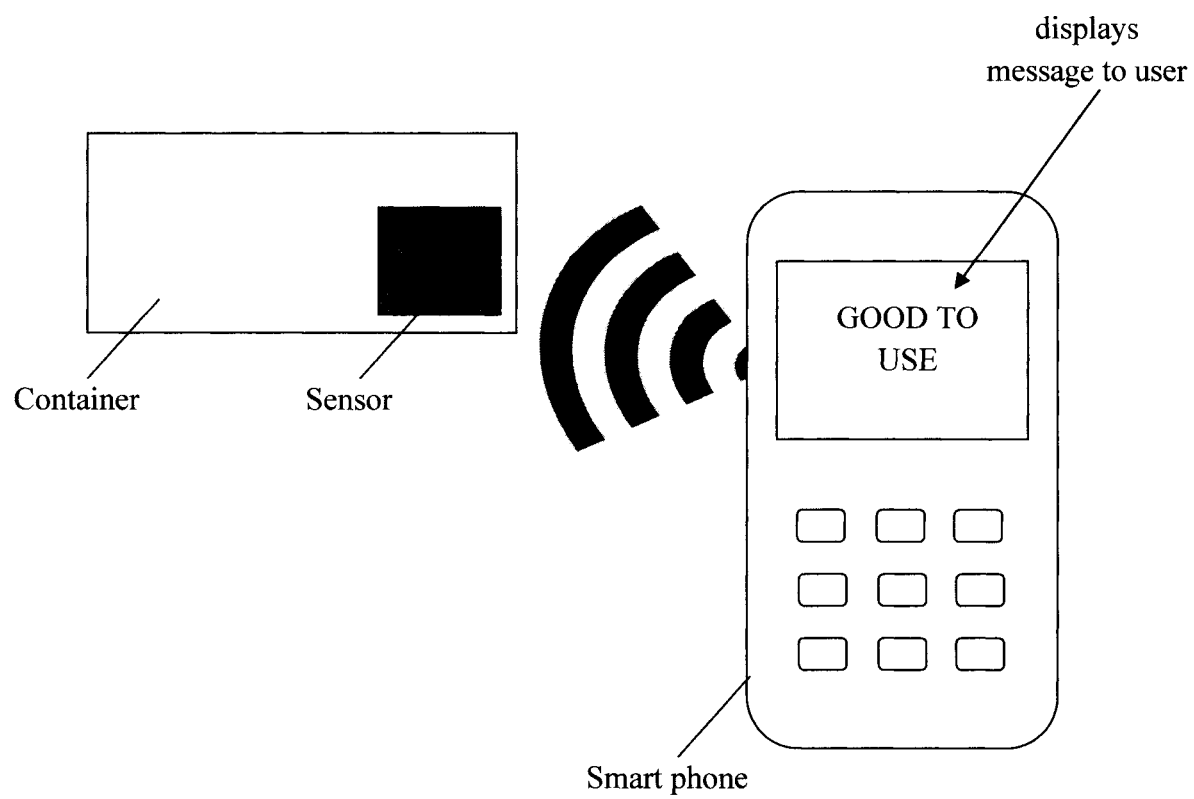
FIG. 5 is a diagram illustrating a smart phone being used as an RFID reader to obtain data from the temperature sensor according to an embodiment of the present invention.

See, for example, FIG. 5 which schematically illustrates a smart phone being used as an RFID reader to obtain data from the temperature sensor. Specifically, when the smart phone is bought near the sensor, energy for operation of the circuit that "reads" the PCM resistor is harvested from the radio frequency RF (electromagnetic field) emitted by the smart phone. The receiver in the smart phone receives the information and, through an application, the phone displays a message to the smart phone user, in this case: "GOOD TO USE."

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A temperature sensor, comprising: at least one phase change material configured to transition from an amorphous state to a crystalline state upon exposure to temperatures above a predetermined threshold temperature for a given duration; and a radio-frequency identification (RFID) circuit in which the at least one phase change material is present, wherein the RFID circuit comprises a comparator circuit with an operational amplifier having a first input connected between a pair of resistors that are connected in series and a second input connected between a resistor and the at least one phase change material connected in series.

2. The temperature sensor of claim 1, wherein the at least one phase change material comprises tellurium in combination with an element selected from the group consisting of: antimony and germanium.

3. The temperature sensor of claim 2, wherein the at least one phase change material comprises tellurium and antimony.

4. The temperature sensor of claim 1, comprising multiple phase change materials each having a different predetermined threshold temperature.

5. The temperature sensor of claim 1, further comprising a light emitting diode (LED) indicator connected directly to an output of the operational amplifier.

6. A method of monitoring temperature exposure of a consumer good, the method comprising: placing a temperature sensor on the consumer good, or in or on a same container as the consumer good, wherein the temperature sensor comprises at least one phase change material configured to transition from an amorphous state to a crystalline state upon exposure to temperatures above a predetermined threshold temperature for a given duration, and an RFID circuit in which the at least one phase change material is present, wherein the RFID circuit comprises a comparator circuit with an operational amplifier having a first input connected between a pair of resistors that are connected in series and a second input connected between a resistor and the at least one phase change material connected in series; and reading the temperature sensor to determine a state of the at least one phase change material by reading the temperature sensor electrically based on output from the RFID circuit.

7. The method of claim 6, wherein the at least one phase change material comprises tellurium in combination with an element selected from the group consisting of: antimony and germanium.

8. The method of claim 7, wherein the at least one phase change material comprises tellurium and antimony.

9. The method of claim 6, wherein the temperature sensor comprises multiple phase change materials each having a different predetermined threshold temperature.

10. The method of claim 6, wherein the temperature sensor is placed in the container.

11. The method of claim 10, wherein the container is selected from the group consisting of: a box, a bag, a bottle, a flask, an ampule, a syringe, a test tube, a tray, and a multi-well plate.

12. The method of claim 6, wherein the consumer good is selected from the group consisting of: foods, chemicals, medications, reagents, electronic hardware, clothing and art pieces.

13. The method of claim 6, wherein the temperature sensor is affixed as a label to the consumer good.

14. The method of claim 6, further comprising:
reading the temperature sensor using an RFID reader.

15. The method of claim 14, wherein the RFID reader comprises a smart phone.

* * * * *